US010183691B2

(12) United States Patent
Segawa (10) Patent No.: US 10,183,691 B2
(45) Date of Patent: Jan. 22, 2019

(54) TORQUE TRANSMISSION JOINT AND ELECTRIC POWER STEERING SYSTEM

(71) Applicant: NSK LTD., Tokyo (JP)

(72) Inventor: Toru Segawa, Maebashi (JP)

(73) Assignee: NSK LTD., Tokyo (JP)

( * ) Notice: Subject to any disclaimer, the term of this patent is extended or adjusted under 35 U.S.C. 154(b) by 43 days.

(21) Appl. No.: 15/325,763

(22) PCT Filed: Apr. 24, 2015

(86) PCT No.: PCT/JP2015/062581
§ 371 (c)(1),
(2) Date: Jan. 12, 2017

(87) PCT Pub. No.: WO2016/038928
PCT Pub. Date: Mar. 17, 2016

(65) Prior Publication Data
US 2017/0174250 A1  Jun. 22, 2017

(30) Foreign Application Priority Data

Sep. 10, 2014  (JP) ................................. 2014-184100
Feb. 25, 2015  (JP) ................................. 2015-034806

(51) Int. Cl.
*B62D 5/04* (2006.01)
*F16D 3/18* (2006.01)
(Continued)

(52) U.S. Cl.
CPC ............. *B62D 5/04* (2013.01); *B62D 5/0406* (2013.01); *B62D 5/0409* (2013.01);
(Continued)

(58) Field of Classification Search
CPC ........ B62D 5/0403; B62D 5/0454; F16D 3/12
See application file for complete search history.

(56) References Cited

U.S. PATENT DOCUMENTS 9,527,523 B2 * 12/2016 Chae ........................ B62D 5/04
2008/0009354 A1 * 1/2008 Hodjat ...................... F16D 3/68
464/87

(Continued)

FOREIGN PATENT DOCUMENTS

GB   1 514 345 A   6/1978
JP   52-60358 A   5/1977
(Continued)

OTHER PUBLICATIONS

Int. Search Report dated Jul. 28, 2015 issued in Int. Application No. PCT/JP2015/062581 (PCT/ISA/210).
(Continued)

*Primary Examiner* — Kevin Hurley
(74) *Attorney, Agent, or Firm* — Sughrue Mion, PLLC (57) ABSTRACT

A torque transmission joint transmits torque between a drive shaft and a driven shaft. The torque transmission joint includes: a coupling including: a first concave-convex portion which is provided on one of inner and outer circumferential surfaces thereof and is engaged with a drive-side concave-convex portion of the drive shaft with a gap; and a second concave-convex portion which is provided on the other of the inner and outer circumferential surfaces and is engaged with a driven-side concave-convex portion of the driven shaft with a gap; a drive-side elastic member which is provided between the drive shaft and the coupling to be torque-transmittable; and a driven-side elastic member which is provided between the coupling and the driven shaft to be torque-transmittable. A concave-convex shape of the first concave-convex portion and a concave-convex shape of the second concave-convex portion are different from each other.

9 Claims, 9 Drawing Sheets (51) Int. Cl.
*F16D 3/12* (2006.01)
*F16H 1/16* (2006.01)
(52) U.S. Cl.
CPC ............ *B62D 5/0421* (2013.01); *F16D 3/12* (2013.01); *F16D 3/18* (2013.01); *F16H 1/16* (2013.01)

(56) References Cited

U.S. PATENT DOCUMENTS

| | | | |
|---|---|---|---|
| 2017/0058991 A1* | 3/2017 | Kim | F16D 3/12 |
| 2017/0114837 A1* | 4/2017 | Yamaguchi | F16D 3/12 |
| 2017/0175821 A1* | 6/2017 | Segawa | F16D 3/68 |
| 2017/0335943 A1* | 11/2017 | Ko | F16D 1/076 |
| 2018/0065656 A1* | 3/2018 | Yun | B62D 5/0403 |

FOREIGN PATENT DOCUMENTS

| | | | |
|---|---|---|---|
| JP | 57-51823 U | 3/1982 | |
| JP | 2-11925 A | 1/1990 | |
| JP | 10-231846 A | 9/1998 | |
| JP | 2004-306898 A | 11/2004 | |
| JP | 2009-51441 A | 3/2009 | |
| JP | 2012-131249 A | 7/2012 | |

OTHER PUBLICATIONS

Written Opinion dated Jul. 28, 2015 issued in Int. Application No. PCT/JP2015/062581 (PCT/ISA/237).
Office Action dated Jun. 13, 2017 by the Japanese Patent Office in counterpart Japanese Patent Application No. 2016-547713.

* cited by examiner

TORQUE TRANSMISSION JOINT AND ELECTRIC POWER STEERING SYSTEM

TECHNICAL FIELD

The present invention relates to a torque transmission joint for transmitting torque between a drive shaft and a driven shaft, and to an electric power steering which uses an electric motor as an auxiliary power source.

BACKGROUND ART

As a system for reducing force required for a driver to operate a steering wheel for providing a steering angle to steered wheels (which are generally front wheels except for special-purpose vehicles), a power steering system is widely used. As this power steering system, an electric power steering system which uses an electric motor as an auxiliary power source has recently widely spread. As the structure of this electric power steering system, various structures are known. In any structure, a rotating shaft is rotated by operating a steering wheel, and auxiliary power of an electric motor is applied to the rotating shaft to provide a steering angle to steered wheels according to the rotation, through a speed reducer. As this speed reducer, a worm speed reducer is generally used. In an electric power steering system using a worm speed reducer, a worm to be rotated by an electric motor is engaged with a worm wheel to rotate together with a rotating shaft, so that the auxiliary power of the electric motor can be transmitted to the rotating shall. In this worm speed reducer, if the rotation direction of the rotating shaft changes, due to backlash which is provided in the engagement portion between the worm and the worm wheel, unpleasant noise called tooth hitting noise may be generated.

Figure 8:
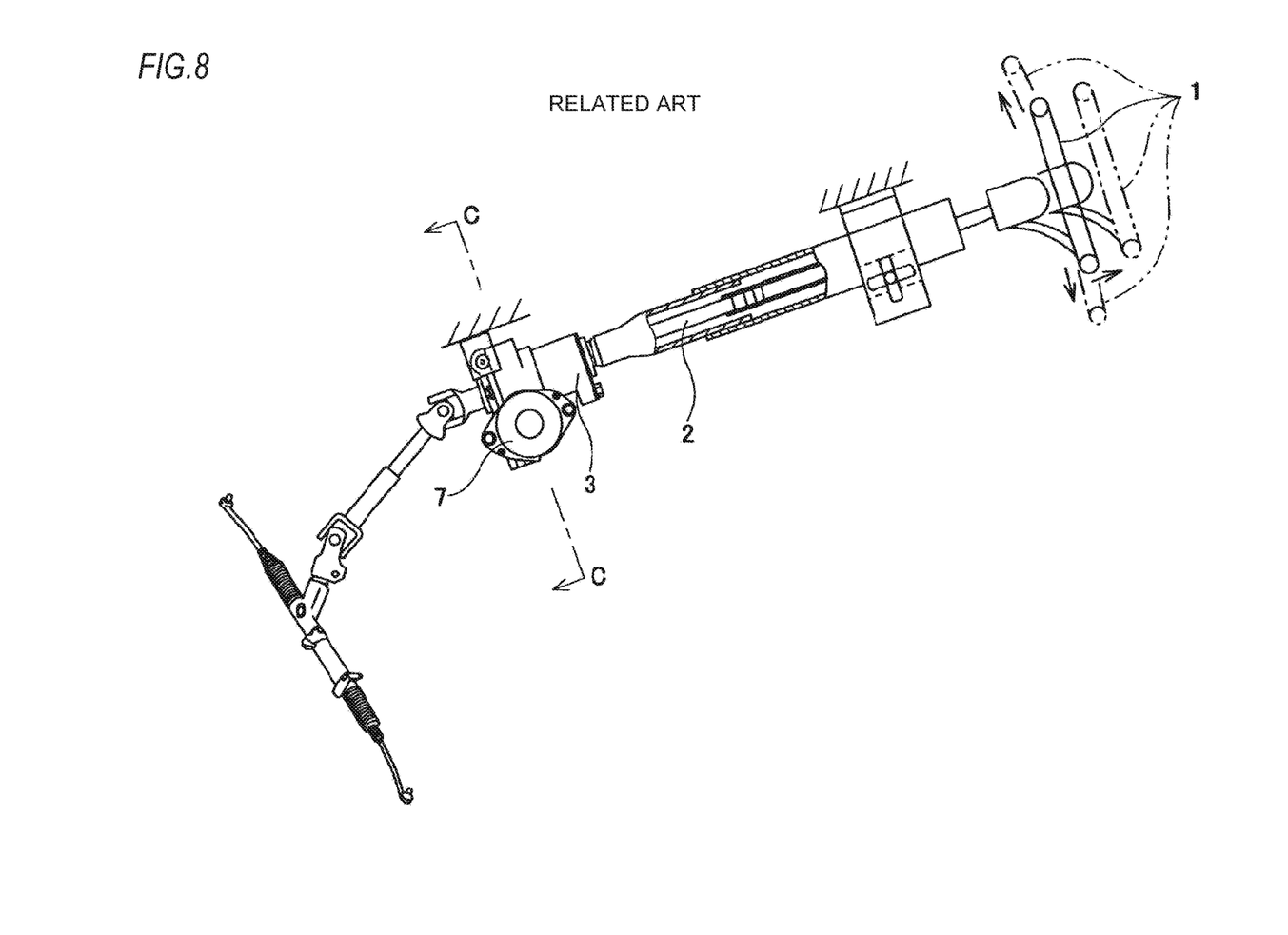
FIG. 8 is a partial longitudinal sectional view showing an example of a vehicle steering system.
Figure 9:
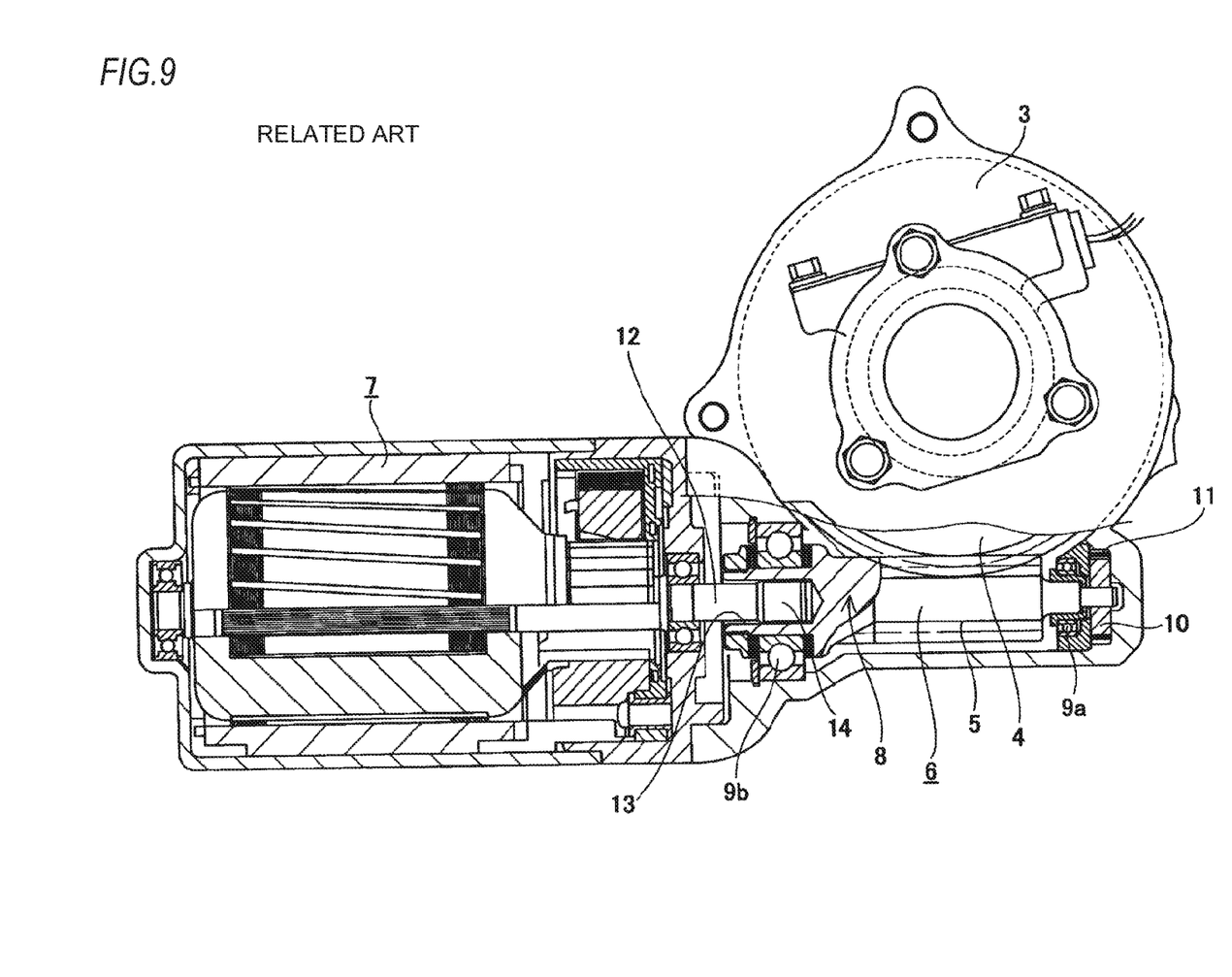
FIG. 9 is an enlarged sectional view showing an example of a conventional structure of an electric power steering system as taken along a line C-C of FIG. 8.

As a structure capable of suppressing generation of tooth hitting noise, it has been considered to elastically press a worm toward a worm wheel by an elastic member such as a spring. FIGS. 8 and 9 show an example of an electric power steering system disclosed in Patent Document 1. A front end portion of a steering shaft 2 which is rotated in a predetermined direction by a steering wheel 1 is supported inside a housing 3 to be rotatable, and a worm wheel 4 is fixed to that portion. Worm teeth 5 to be engaged with the worm wheel 4 are provided on a middle portion of a worm shaft 6, and both axis-direction end portions of a worm 8 to be rotated by an electric motor 7 are supported inside the housing 3 by a pair of rolling bearings 9a and 9b such as deep groove type ball bearings such that the worm can rotate. A pressing piece 10 is fit on a portion of the tip end portion of the worm shaft 6 protruding from the rolling bearing 9a, and an elastic member such as a coil spring 11 is provided between the pressing piece 10 and the housing 3. The coil spring 11 presses the worm teeth 5 provided on the worm shaft 6 toward the worm wheel 4 with the pressing piece 10 interposed therebetween. According to this configuration, backlash between the worm teeth 5 and the worm wheel 4 is suppressed, and generation of tooth hitting noise is suppressed.

The above-described conventional structure can suppress tooth hitting noise from being generated at the engagement portion between the worm teeth 5 and the worm wheel 4 but cannot suppress noise from being generated at the joint portion between the tip end portion of the output shaft 12 of the electric motor 7 and the base end portion of the worm shaft 6. This point will be described below. In the structure shown in FIG. 9, in order to join the tip end portion of the output shaft 12 of the electric motor 7 and the base end portion of the worm shaft 6 such that torque can be transmitted, a spline hole 13 is formed in the base end portion of the worm shaft 6 so as to be opened on the base end surface of the worm shaft 6.

Meanwhile, a spline shaft portion 14 is formed at the tip end portion of the output shaft 12. Then, the spline shaft portion 14 and the spline hole 13 are spline-engaged, whereby the output shaft 12 and the worm shaft 6 are joined such that torque can be transmitted.

If the spline shaft portion 14 and the spline hole 13 are spline-engaged without a gap in a circumferential direction (without backlash), noise is not generated at the joint portion between the tip end portion of the output shaft 12 and the base end portion of the worm shaft 6 (the spline engagement portion). However, in actual products, at this spline engagement portion, backlash is provided. Especially, in a structure which uses the structure shown in FIG. 9 to suppress backlash between the worm teeth 5 and the worm wheel 4, since it is required to swing the worm shaft 6 to displace the worm shaft, backlash at the spline engagement portion cannot completely be eliminated, and it is difficult to prevent noise generation.

Patent Document 2 discloses a structure in which an output shaft of an electric motor and a worm shaft are joined with a columnar metal power transmission member interposed therebetween such that the worm shaft can be smoothly swung to be displaced. Even in the structure disclosed in Patent Document 2, at each of spline engagement portions of spline shaft portions (male splines) provided at both end portions of the power transmission member and spline holes (female splines) formed in end portions of the worm shaft and the output shaft of the electric motor for displacement of the worm shaft by swinging, backlash exists. Therefore, there is a possibility that noise will be generated when changing the rotation direction of the rotating shaft. Also, there is a possibility that, since the power transmission member is provided, the axis-direction dimension of the joint portion of the output shaft of the electric motor and the worm shaft may increase, resulting in increases in the size and weight of the whole electric power steering system.

PRIOR ART DOCUMENTS

Patent Document

Patent Document 1: JP-A-2004-306898
Patent Document 2: JP-A-2012-131249

SUMMARY OF THE INVENTION

Problems to be Solved by the Invention

The present invention has been made in view of the above-described circumstances, and an object of the present invention is to provided a structure of a torque transmission joint capable of preventing noise from being generated when changing a rotation direction of a drive shaft.

Means for Solving the Problems

A torque transmission joint according to an embodiment of the present invention is configured to transmit torque between a tip end portion of a drive shaft and a base end portion of a driven shaft arranged in series in an axis direction, and comprises a coupling, a driven-side elastic member, and a drive-side elastic member.

The coupling including: a first concave-convex portion which is provided on one of inner and outer circumferential surfaces thereof, has concave portions and convex portions formed alternately in a circumferential direction over an entire circumference and is engaged with a drive-side concave-convex portion provided on a circumferential surface of the tip end portion of the drive shaft with a gap (backlash) in the circumferential direction; and a second concave-convex portion which is provided on the other of the inner and outer circumferential surfaces, has concave portions and convex portions formed alternately in the circumferential direction over the entire circumference and is engaged with a driven-side concave-convex portion provided on a circumferential surface of the base end portion of the driven shaft with a gap in the circumferential direction.

The drive-side elastic member is made of an elastic material and is provided between the drive shaft and the coupling such that torque can be transmitted.

The driven-side elastic member is made of an elastic material and is provided between the coupling and the driven shaft such that torque can be transmitted.

A concave-convex shape of the first concave-convex portion in the circumferential direction and a concave-convex shape of the second concave-convex portion in the circumferential direction are different from each other. Specifically, for example, the number of convex portions (concave portions) constituting the first concave-convex portion and the number of convex portions (concave portions) constituting the second concave-convex portion are different from each other.

The coupling may be made of a material having rigidity higher than those of the drive-side elastic member and the driven-side elastic member, for example, a synthetic resin, or a metal such as an iron-based metal like carbon steel or a light alloy like an aluminum-based alloy. Alternatively, a radially-inner-side half portion and a radially-outer-side half portion of the coupling may be made of different materials. In this case, in order to prevent creep from occurring between the radially-inner-side half portion and the radially-outer-side half portion, it is preferable to provide a creep preventing mechanism such as key engagement.

The drive-side elastic member may include: a drive-side first engagement portion which is provided on one side portion of the circumferential surface thereof in the axis direction over the entire circumference and is engaged with the drive-side concave-convex portion; and a drive-side second engagement portion which is provided on the other side portion of the circumferential surface thereof in the axis direction over the entire circumference and is engaged with the second concave-convex portion.

The driven-side elastic member may include: a driven-side first engagement portion which is provided on one side portion of the circumferential surface thereof in the axis direction over the entire circumference and is engaged with the first concave-convex portion; and a driven-side second engagement portion provided on the other side portion of the circumferential surface thereof in the axis direction over the entire circumference and is engaged with the driven-side concave-convex portion.

The gap in the circumferential direction between the first concave-convex portion and the drive-side concave-convex portion may be larger than a gap in the circumferential direction between the drive-side first engagement portion and the drive-side concave-convex portion and than a gap in the circumferential direction between the drive-side second engagement portion and the second concave-convex portion.

The gap in the circumferential direction between the second concave-convex portion and the driven-side concave-convex portion may be larger than a gap in the circumferential direction between the driven-side first engagement portion and the first concave-convex portion and than a gap in the circumferential direction between the driven-side second engagement portion and the driven-side concave-convex portion.

At least at an end portion of an engagement portion between the first concave-convex portion and the drive-side concave-convex portion on one side in the axis direction, the gap in the circumferential direction between the first concave-convex portion and the drive-side concave-convex portion may increase as proceeding toward one side in the axis direction.

Specifically, for example, at least at the end portion, side surfaces of adjacent concave portions constituting the first concave-convex portion, which face each other in the circumferential direction may separate farther from each other as proceeding toward the one side in the axis direction.

In a state where the torque transmission joint is assembled between the drive shaft and the driven shaft, at least one of the drive-side elastic member and the driven-side elastic member may exert elastic force in the axis direction.

For example, the drive-side elastic member may include: a large-diameter portion which is provided on one side in the axis direction and has the drive-side first engagement portion; a small-diameter portion which is provided on the other side in the axis direction and has the drive-side second engagement portion and a diameter-reduced portion which is provided at a middle portion between the large-diameter portion and the small-diameter portion in the axis direction.

An electric power steering system according to another embodiment of the present invention comprises a housing, a rotating shaft, a worm wheel, a worm and an electric motor.

The housing is supported on a fixed part and thus does not rotate (the housing is supported to be unrotatable).

The rotating shaft is provided to be rotatable with respect to the housing and is rotated by operating a steering wheel to provide a steering angle to steered wheels according to the rotation.

The worm wheel is supported on a portion of the rotating shaft inside the housing coaxially with the rotating shaft and is rotated together with the rotating shaft.

The worm includes worm teeth formed on a middle portion of a worm shaft in an axis direction. In a state where the worm teeth are engaged with the worm wheel, both end portions of the worm shaft in the axis direction are supported by bearings, respectively, to be rotatable with respect to the housing.

The electric motor rotates the worm.

An output shaft of the electric motor and the worm shaft are connected by a torque transmission joint such that torque can be transmitted.

Here, the torque transmission joint is the above-described torque transmission joint. In this case, the output shaft of the electric motor corresponds to the drive shaft, and the worm shaft corresponds to the driven shaft.

The electric power steering system may further comprise a preload applying mechanism which is provided between the housing and a tip end portion of the worm shaft (the end portion positioned on the opposite side to the side joined with the output shaft of the electric motor with the torque transmission joint interposed therebetween) and elastically presses the worm toward the worm wheel.

The tip end portion of the output shaft and the base end portion of the worm shaft may be arranged to overlap each other in a radial direction.

Effects of the Invention

According to the torque transmission joint and the electric power steering system described above, noise can be prevented from being generated when changing the rotation direction of the drive shaft.

That is, if torque to be transmitted between the drive shaft and the driven shaft is relatively small, the rotary torque of the drive shaft can be transmitted to the coupling through the drive-side elastic member made of an elastic material. Then, the torque transmitted to the coupling can be transmitted to the driven shaft through the driven-side elastic member made of an elastic material.

If torque to be transmitted between the drive shaft and the driven shaft increases, the drive-side elastic member and the driven-side elastic member are elastically deformed (elastically crushed) in the circumferential direction. Further, the circumferential-direction side surfaces of the convex portions constituting the drive-side concave-convex portion of the drive shaft and the circumferential-direction side surfaces of the convex portions constituting the first concave-convex portion of the coupling abut on (come into contact with) each other, and the side surfaces of the convex portions constituting the second concave-convex portion of the coupling and the side surfaces of the convex portions constituting the driven-side concave-convex portion of the driven shaft abut on (come into contact with) each other in the circumferential direction. Since the power of abutting of them weakens due to the drive-side elastic member and the driven-side elastic member, harsh noise such as tooth hitting noise can be prevented from being generated at the engagement portion of the concave-convex portions due to abutting. In this state, most of the rotary torque of the drive shaft is transmitted to the coupling by the engagement portion between the drive-side concave-convex portion and the first concave-convex portion, and most of the torque transmitted to the coupling is transmitted to the driven shaft by the engagement portion between the second concave-convex portion and the driven-side concave-convex portion. As described above, according to the above-described configuration, the torque transmission performance between the drive shaft and the driven shaft can be divided into two stages according to the magnitude of transmission torque.

Also, according to the above-described configuration, the drive-side concave-convex portion provided on the tip end portion of the drive shaft is engaged with the first concave-convex portion provided on one side circumferential surface of the inner circumferential surface of the coupling, and the driven-side concave-convex portion provided on the base end portion of the driven shaft is engaged with the second concave-convex portion provided the other side circumferential surface. Therefore, for example, the tip end portion of the drive shaft and the base end portion of the driven shaft can be arranged to overlap each other in the radial direction, whereby the axis-direction dimension of the torque transmission portion between the drive shaft and the driven shaft can be prevented from unnecessarily increasing.

DESCRIPTION OF EMBODIMENTS

FIGS. 1 to 6 show an example according to an embodiment of the present invention. The present example provides a structure capable of preventing noise such as tooth hitting noise from being generated when changing the rotation direction of the output shaft of an electric motor which is a drive shaft. In an electric power steering system of the present example, similarly to the conventional structure shown in FIGS. 8 and 9, the front end portion of a steering shaft 2 to be rotated in a predetermined direction by a steering wheel 1 is supported inside a housing 3 such that the steering shaft can rotate, and a worm wheel 4 is fixed to that portion. Worm teeth 5 to be engaged with the worm wheel 4 are provided on a middle portion of a worm shaft 6a in the axis direction, and both axis-direction end portions of a worm 8 to be rotated by an electric motor 7 are supported inside the housing 3 by a pair of rolling bearings 9a and 9b, such that the worm can rotate. Between the rolling bearing 9a fit on the tip end portion of the worm shaft 6a and the housing 3, a preload applying mechanism 33 is provided to press the worm teeth 5 provided on the worm shaft 6a toward a worm wheel 4. According to this configuration, backlash between the worm teeth 5 and the worm wheel 4 is suppressed, and generation of tooth hitting noise is suppressed.

Figure 1:
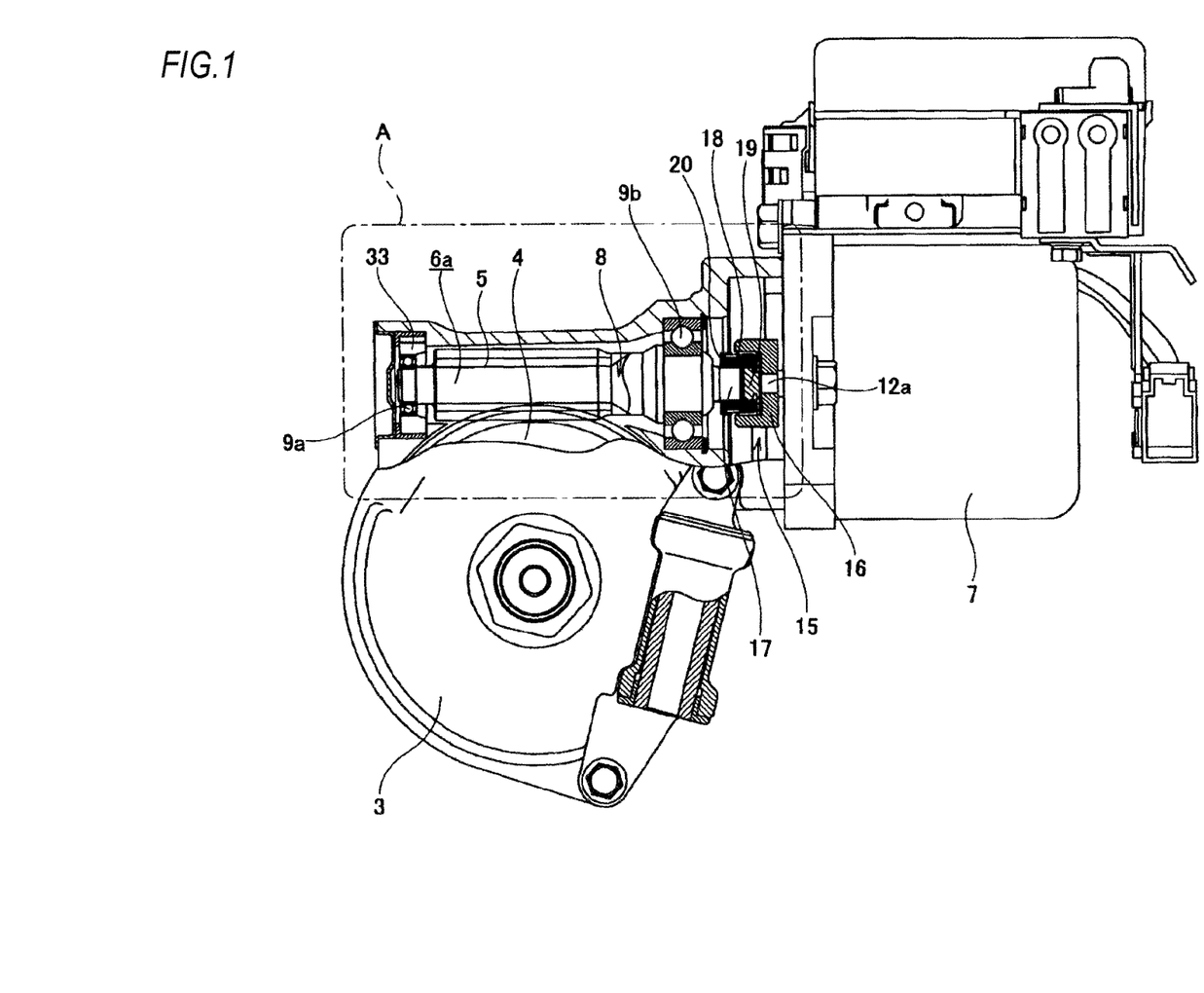
FIG. 1 is a partial sectional side view of an example according to an embodiment of the present invention.
Figure 2:
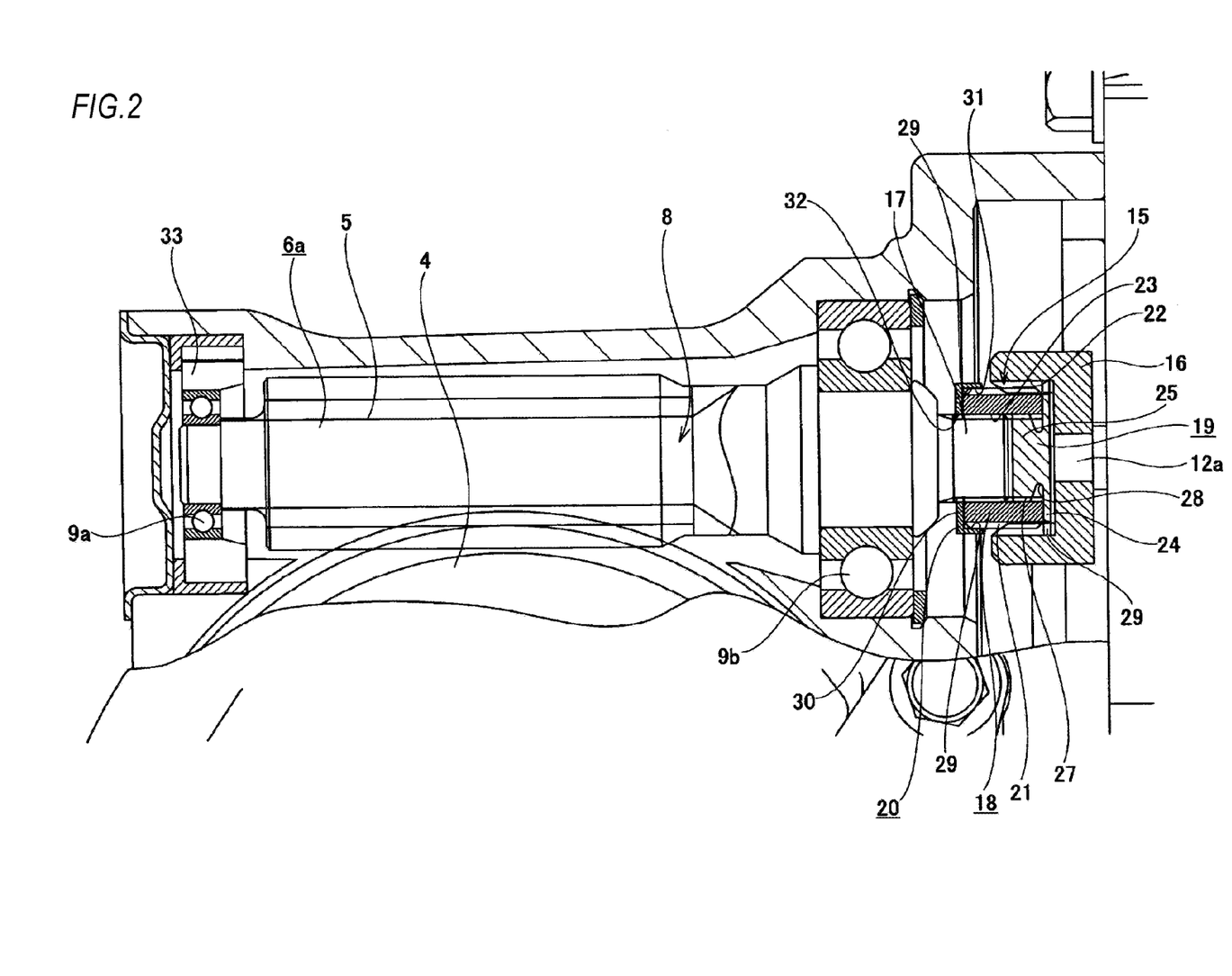
FIG. 2 is an enlarged view of an A portion of FIG. 1.
Figure 3:
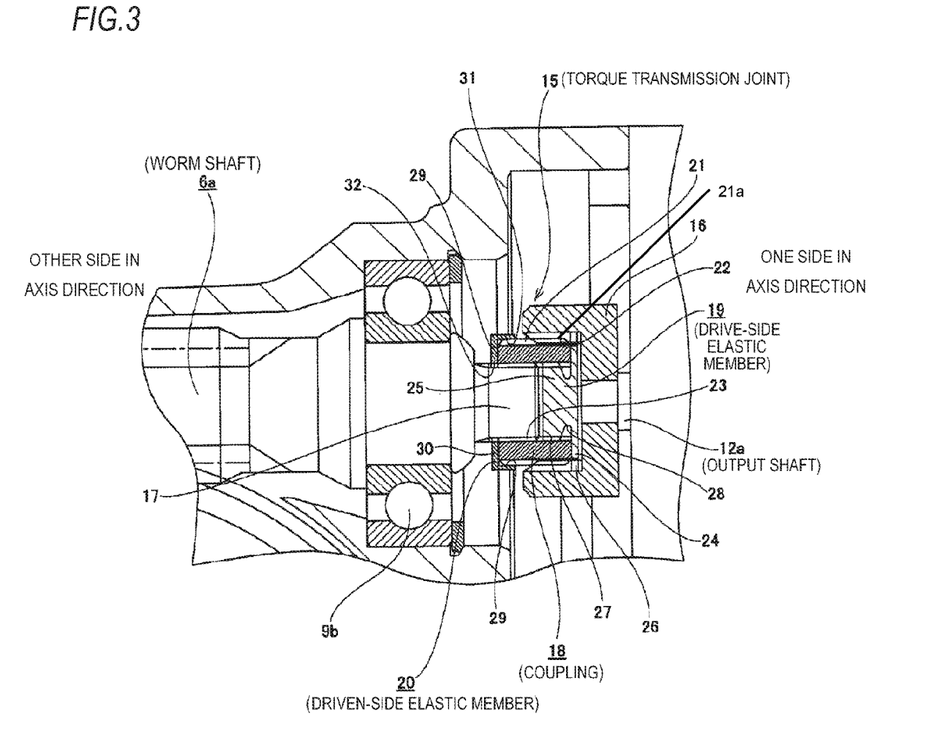
FIG. 3 is an enlarged view of a right portion of FIG. 2.
Figure 4A:
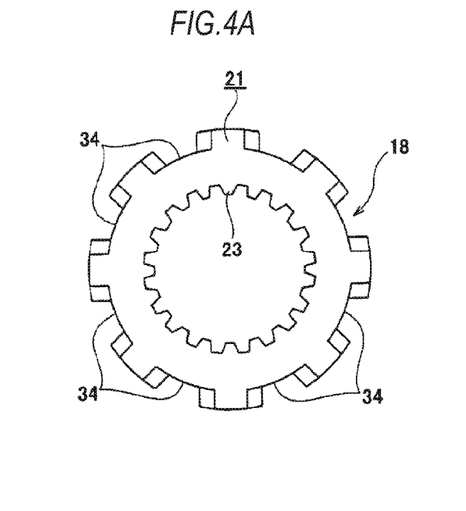
FIGS. 4A and 4B are a front view and a right side view showing a coupling, respectively.
Figure 4B:
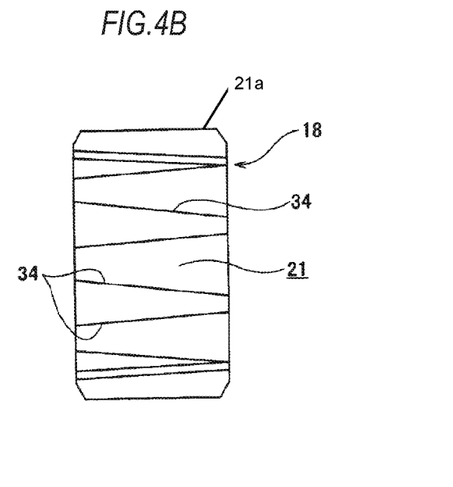
Figure 5A:
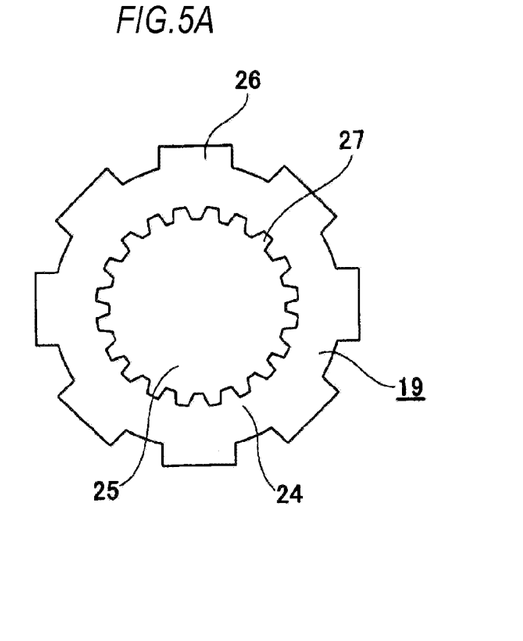
FIGS. 5A and 5B are a front view and a left side view showing a drive-side elastic member, respectively.
Figure 5B:
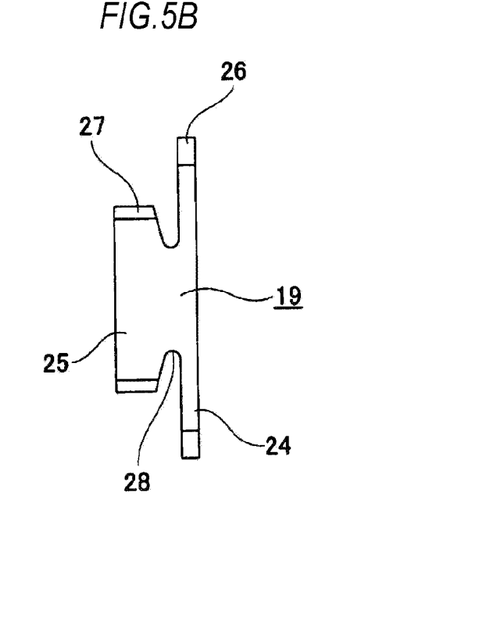
Figure 6A:
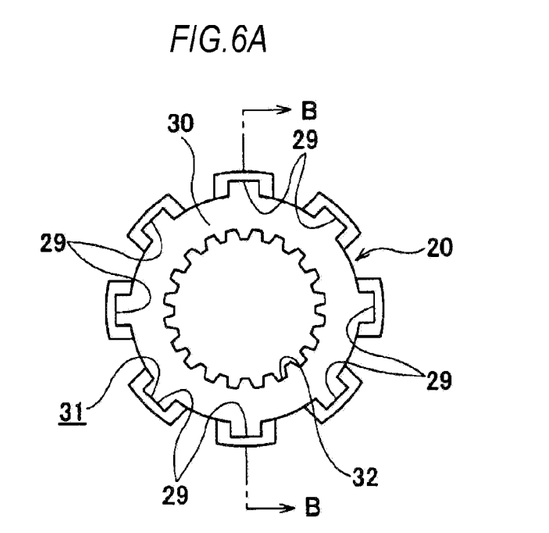
FIG. 6A is a front view showing a driven-side elastic member.
Figure 6B:
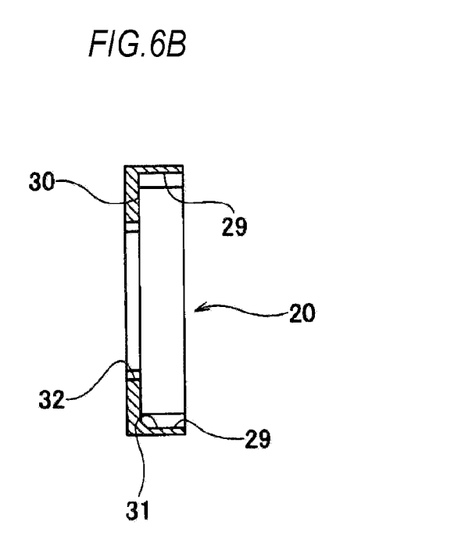
FIG. 6B is a sectional view taken along a line B-B of FIG. 6A.
Figure 7:
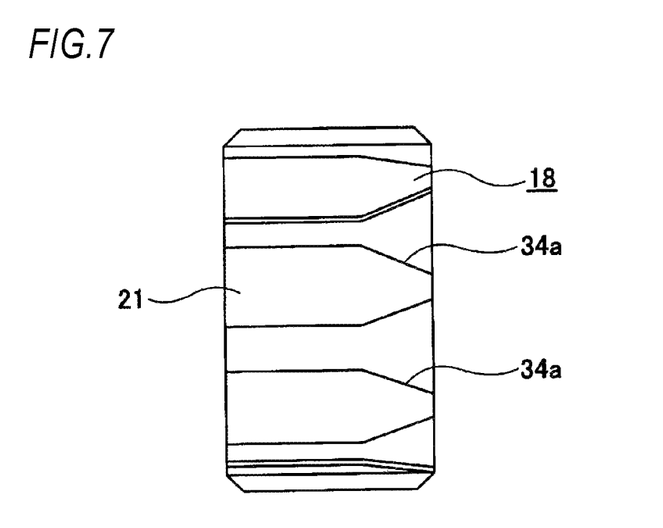
FIG. 7 is a view showing another shape of the coupling and corresponding to FIG. 4B.

In the present example, the tip end portion of the output shaft 12a of the electric motor 7 and the base end portion of the worm shaft 6a (e.g., a driven shaft) are joined with a torque transmission joint 15 interposed therebetween, such that torque can be transmitted. Specifically, the torque transmission joint 15 is provided between a drive-side transmission member 16 supported on the tip end portion of the output shaft 12a (e.g., a drive shaft) coaxially with the tip end portion such that the drive-side transmission member cannot rotate with respect to the tip end portion, and a spline shaft portion 17 provided on the base end portion of the worm shaft 6a. The torque transmission joint 15 includes a coupling 18, a drive-side elastic member 19, and a driven-side elastic member 20. The coupling 18 is formed to have a generally cylindrical shape and has a radially-outer-side concave-convex portion 21 (e.g., a first concave-convex portion) having concave portions and convex portions formed alternately in the circumferential direction over the entire circumference on the outer circumferential surface. A half portion positioned on one side in the axis direction (the right half portion in FIGS. 1 to 3) of the radially-outer-side concave-convex portion 21 is engaged with a drive-side concave-convex portion 22 provided over the entire circumference on the inner circumferential surface of the drive-side transmission member 16, with a gap (backlash) in the circumferential direction. The coupling 18 has a radially-inner-side concave-convex portion 23 (e.g., second concave-convex portion) having a female spline shape and having concave portions and convex portions formed alternately in the circumferential direction over the entire circumference on the inner circumferential surface. A half portion positioned on the other side in the axis direction (the left half portion in FIGS. 1 to 3) of the radially-inner-side concave-convex portion 23 is engaged with the spline shaft portion 17 with a gap in the circumferential direction. The gap in the circumferential direction between the radially-outer-side concave-convex portion 21 and the drive-side concave-convex portion 22, and the gap in the circumferential direction between the radially-inner-side concave-convex portion 23 and the spline shaft portion 17 may be set to arbitrary sizes, respectively (the gaps may be set to be the same as each other or to be different from each other). Side surfaces of adjacent concave portions 34 constituting the radially-outer-side concave-convex portion 21, which face each other in the circumferential direction are inclined as shown in FIG. 4B, such that the side surfaces separate farther from each other as proceeding toward one side in the axis direction (i.e. the right side in FIG. 4B) (the width between concave portions 34 in the circumferential direction widens as proceeding toward one side in the axis direction). Alternatively, as shown in FIG. 7, only axis-direction one-side end portions of side surfaces of adjacent concave portions 34a constituting the radially-outer-side concave-convex portion 21, which face each other in the circumferential direction may be inclined such that the side surfaces separate farther from each other as proceeding to one side in the axis direction. The drive-side concave-convex portion 22 which is engaged with the axis-direction one-side half portion of the radially-outer-side concave-convex portion 21 is formed such that two side surfaces of concave portions constituting the drive-side concave-convex portion 22, which face each other in the circumferential direction become flat surfaces parallel to each other over the axis direction. The concave-convex shape of the radially-outer-side concave-convex portion 21 in the circumferential direction, and the concave-convex shape of the radially-inner-side concave-convex portion 23 in the circumferential direction are set to be different from each other. Specifically, the number of convex portions (concave portions) which constitute the radially-outer-side concave-convex portion 21 (or the width dimension in the circumferential direction, the inclination state of side surfaces in the circumferential direction, or the like), and the number of convex portions (concave portions) which constitute the radially-inner-side concave-convex portion 23 (or the width dimension in the circumferential direction, the inclination state of side surfaces in the circumferential direction, or the like) are set to be different from each other. The coupling 18 is made of a synthetic resin such as polyacetal resin or polyamide resin, or a metal material such as an iron-base metal like carbon steel or a light alloy like an aluminum-based alloy, unlikely to be elastically deformed (having high rigidity) as compared to elastomer like rubber. Alternatively, the radially-inner-side half portion and radially-outer-side half portion of the coupling 18 may be made of different materials. Specifically, for example, the radially-inner-side half portion having the radially-inner-side concave-convex portion 23 formed with a smaller pitch on the inner circumferential surface is made of a metal material, and the radially-outer-side half portion having the radially-outer-side concave-convex portion 21 formed with a larger pitch on the outer circumferential surface is made of a synthetic resin. If the radially-inner-side half portion and radially-outer-side half portion of the coupling 18 are made of different materials as described above, the weight can be decreased, and the strength of the radially-inner-side concave-convex portion 23 having a smaller pitch can be easily secured. When making the radially-inner-side half portion and radially-outer-side half portion of the coupling 18 with different materials, in order to prevent creep from occurring between the radially-inner-side half portion and the radially-outer-side half portion, it is preferable to provide a creep preventing mechanism such as key engagement between both half portions.

The drive-side elastic member 19 is made of an elastic material such as elastomer like rubber in a stepped columnar shape and includes a large-diameter portion 24 provided at one end portion in the axis direction (the right end portion in FIGS. 1 to 3), a small-diameter portion 25 provided at the other end portion in the axis direction (the left end portion in FIGS. 1 to 3), and a diameter-reduced portion 28 provided in the middle portion in the axis direction. The drive-side elastic member 19 has a drive-side first engagement portion 26 which is an concave-convex portion provided over the entire circumference on the outer circumferential surface of the large-diameter portion 24 and is engaged with one end portion of the drive-side concave-convex portion 22 in the axis direction without a gap in the circumferential direction, and has a drive-side second engagement portion 27 which is an concave-convex portion (a male spline) provided over the entire circumference on the outer circumferential surface of the small-diameter portion 25 and is engaged with one end portion of the radially-inner-side concave-convex portion 23 in the circumferential direction without a gap in the circumferential direction. However, gaps may be provided between the drive-side first engagement portion 26 and the drive-side concave-convex portion 22 and between the drive-side second engagement portion 27 and the radially-inner-side concave-convex portion 23, in circumferential direction, respectively. In this case, the gap in the circumferential direction between the drive-side first engagement portion 26 and the drive-side concave-convex portion 22, and the gap in the circumferential direction between the drive-side second engagement portion 27 and the radially-inner-side concave-convex portion 23 may be set to be smaller than the gap in the circumferential direction between the radially-outer-side concave-convex portion 21 and the drive-side concave-convex portion 22. Since the diameter-reduced portion 28 is provided, in a state where the torque transmission joint 15 is assembled between the output shaft 12a and the worm shaft 6a, the drive-side elastic member 19 becomes elastic in the axis direction (the drive-side elastic member is compressed in the axis direction), thereby elastically pressing the coupling 18 and the worm shaft 6a to separate farther from the output shaft 12a.

The driven-side elastic member 20 is made of an elastic material such as elastomer like rubber and includes a plurality of engagement concave portions 29 disposed at regular intervals in the circumferential direction, and a circular ring portion 30 connecting the end edges of the individual engagement concave portions 29 on the other side in the axis direction. The driven-side elastic member 20 has a driven-side first engagement portion 31 and a driven-side second engagement portion 32. The driven-side first engagement portion 31 includes the engagement concave portions 29 and is provided on a portion of the driven-side elastic member 20 positioned on one side in the axis direction. The driven-side first engagement portion 31 is engaged with the end portion of the radially-outer-side concave-convex portion 21 positioned on the other side in the axis direction without a gap in the circumferential direction (the engagement concave portions 29 are engaged with the convex portions constituting the radially-outer-side concave-convex portion 21 without a gap in the circumferential direction). The driven-side second engagement portion 32 is a concave-convex portion provided over the entire circumference on the inner circumferential surface of the circular ring portion 30 and provided at a portion of the driven-side elastic member 20 positioned on the other side in the axis direction. The driven-side second engagement portion 32 is engaged with the end portion of the spline shaft portion 17 positioned on the other side in the axis direction without a gap. However, gaps may be provided between the driven-side first engagement portion 31 and the radially-outer-side concave-convex portion 21 and between the driven-side second engagement portion 32 and the spline shaft portion 17, in the circumferential direction, respectively. In this case, the gap between the driven-side first engagement portion 31 and the radially-outer-side concave-convex portion 21 and the gap between the driven-side second engagement portion 32 and the spline shaft portion 17 may be set to be smaller than the gap in the circumferential direction between the radially-inner-side concave-convex portion 23 and the spline shaft portion 17.

In the present example, the torque transmission joint 15 is assembled between the output shaft 12a and the worm shaft 6a, and the end portion of the drive-side transmission member 16 positioned on the other side in the axis direction and the end portion of the spline shaft portion 17 positioned on one side in the axis direction are disposed to overlap each other in the radial direction.

In the electric power steering system of the present example described above, if torque to be transmitted between the output shaft 12a of the electric motor 7 and the worm shaft 6a is relatively small, the rotary torque of the output shaft 12a is transmitted from the engagement portion between the drive-side concave-convex portion 22 and the drive-side first engagement portion 26 to the drive-side elastic member 19, and is transmitted from the engagement portion between the drive-side second engagement portion 27 and the radially-inner-side concave-convex portion 23 to the coupling 18. Then, the torque transmitted to the coupling 18 is transmitted from the engagement portions between the radially-outer-side concave-convex portion 21 and the driven-side first engagement portion 31 to the driven-side elastic member 20, and is transmitted from the engagement portion between the driven-side second engagement portion 32 and the spline shaft portion 17 to the worm shaft 6a.

In contrast, if torque to be transmitted between the output shaft 12a and the worm shaft 6a increases, the drive-side elastic member 19 and the driven-side elastic member 20 are elastically deformed in the circumferential direction. In other words, the convex portions constituting the drive-side first and second engagement portions 26 and 27 of the drive-side elastic member 19 are elastically crushed in the circumferential direction (the width dimensions of the convex portions decrease), and the convex portions constituting the driven-side first and second engagement portions 31 and 32 of the driven-side elastic member 20 are elastically crushed in the circumferential direction (the width dimensions of the convex portions decrease).

Further, the circumferential-direction side surfaces of the convex portions constituting the drive-side concave-convex portion 22 and the circumferential-direction side surfaces of the convex portions constituting the radially-outer-side concave-convex portion 21 abut on (come into contact with) each other, and the circumferential-direction side surfaces of the convex portions constituting the radially-inner-side concave-convex portion 23 and the circumferential-direction side surfaces of the convex portions constituting the spline shaft portion 17 abut on (come into contact with) each other. Since the power of abutting of them weakens due to elastic deformation of the drive-side elastic member 19 and the driven-side elastic member 20, harsh noise such as tooth hitting noise can be prevented from being generated at the engagement portion between the drive-side concave-convex portion 22 and the radially-outer-side concave-convex portion 21 and the engagement portion between the radially-inner-side concave-convex portion 23 and the spline shaft portion 17 due to the abutting. Further, in this state, most of the rotary torque of the output shaft 12a is transmitted from the engagement portion between the drive-side concave-convex portion 22 and the radially-outer-side concave-convex portion 21 to the coupling 18, and most of the torque transmitted to the coupling 18 is transmitted from the engagement portion between the radially-inner-side concave-convex portion 23 and the spline shaft portion 17 to the worm shaft 6a.

According to the electric power steering system of the present example described above, torque transmission between the output shaft 12a and the worm shaft Ca is performed through the torque transmission joint 15 configured by assembling the coupling 18, the drive-side elastic member 19, and the driven-side elastic member 20, whereby the torque transmission performance can be divided into two stages according to the magnitude of transmission torque, and a feeling of operation of the steering wheel 1 can be improved (see FIG. 8). That is, in general, in the electric power steering system, if a vibration load is applied from the vehicle wheel side to the steering shaft 2, for example, due to a rough road surface, or the like, torque is applied to the worm wheel 4 fixed to the steering shaft 2. Then, if a torque sensor detects that torque, a controller (not shown) generates torque in a direction to eliminate the detected torque by the electric motor 7. As a result, a feeling of operation of the steering wheel 1 can be improved. Here, the worm shaft 6a having the worm teeth 5 which are engaged with the worm wheel 4 tends to rotate due to the reaction force of torque applied to the worm wheel 4, and when resistance (torsional rigidity) against relative rotation of the worm shaft 6a and the output shaft 12a of the electric motor 7 is high, resistance against rotation of the worm shaft 6a increases. Since torque which is applied to the worm wheel 4 based on a vibration load applied to the steering shaft 2 is relatively small, if the resistance against rotation of the worm shaft 6a is large, there is a possibility that a feeling of operation of the steering wheel 1 may be lost. In the present example, since torque transmission between the output shaft 12a and the worm shaft 6a is performed through the torque transmission joint 15, whereby the torsional rigidity can be reduced when transmission torque between the output shaft 12a and the worm shaft 6a is small, and the torsional rigidity can be increased when transmission torque is large. Therefore, a feeling of operation of the steering wheel 1 can be improved.

Further, in the present example, even when the worm shaft 6a is displaced by swinging or the center axis of the worm shaft 6a and the center axis of the output shaft 12a do not coincide with each other due to decentering, torque transmission can be smoothly performed between the output shaft 12a and the worm shaft 6a by inclining the coupling 18 with respect to the center axis of the worm shaft 6a and the center axis of the output shaft 12a. Especially, in the present example, since side surfaces of adjacent concave portions 34 constituting the radially-outer-side concave-convex portion 21, which facing each other in the circumferential direction, are inclined such that the side surfaces separate farther from each other as proceeding toward one side in the axis direction, even when the coupling 18 is inclined with respect to the center axis of the output shaft 12a, partial contact can be prevented between the radially-outer-side concave-convex portion 21, having an end portion 21a, and the drive-side concave-convex portion 22 (the circumferential-direction side surfaces of the convex portions constituting the radially-outer-side concave-convex portion 21 and the drive-side concave-convex portion 22 are brought into surface contact with each other). Therefore, stress concentration and abrasion can be suppressed at the engagement portion between the radially-outer-side concave-convex portion 21 and the drive-side concave-convex portion 22, thereby securing not only the durability of the torque transmission joint 15 but also the durability of the whole electric power steering system.

Further, in the present example, the drive-side concave-convex portion 22 of the output shaft 12a is engaged with the radially-outer-side concave-convex portion 21 provided on the outer circumferential surface of the coupling 18, and the spline shaft portion 17 of the worm shaft 6a is engaged with the radially-inner-side concave-convex portion 23 provided on the inner circumferential surface of the coupling 18, whereby the tip end portion (the drive-side transmission member 16) of the output shaft 12a and the base end portion (the spline shaft portion 17) of the worm shaft 6a are disposed so as to overlap each other in the radial direction. Therefore, the axis-direction dimensions of the torque transmission portions of the output shaft 12a and the worm shaft 6a can be prevented from unnecessarily increasing, and thus the size and weight of the electric power steering system decrease.

Further, in the present example, since the drive-side elastic member 19 elastically presses the coupling 18 and the worm shaft 6a to separate farther from the output shaft 12a, when the rotation direction of the worm shaft 6a changes, hitting noise can be suppressed from being generated in the pair of rolling bearings 9a and 9b due to displacement of the worm shaft 6a in the axis direction.

Further, in implementing the present invention, the drive-side concave-convex portion 22 may be directly formed on the inner circumferential surface of the recess formed in the tip end portion of the electric motor, without interposing the drive-side transmission member 16 therebetween. Also, the radially-inner-side concave-convex portion of the coupling may be engaged with the spline shaft portion provided on the tip end portion of the output shaft of the electric motor, and the radially-outer-side concave-convex portion of the coupling may be engaged with the driven-side concave-convex portion provided on the inner circumferential surface of the base end portion of the worm shaft. The elastic coefficients of the drive-side elastic member and the driven-side elastic material may be set to be the same as or different from each other.

Figure 10:
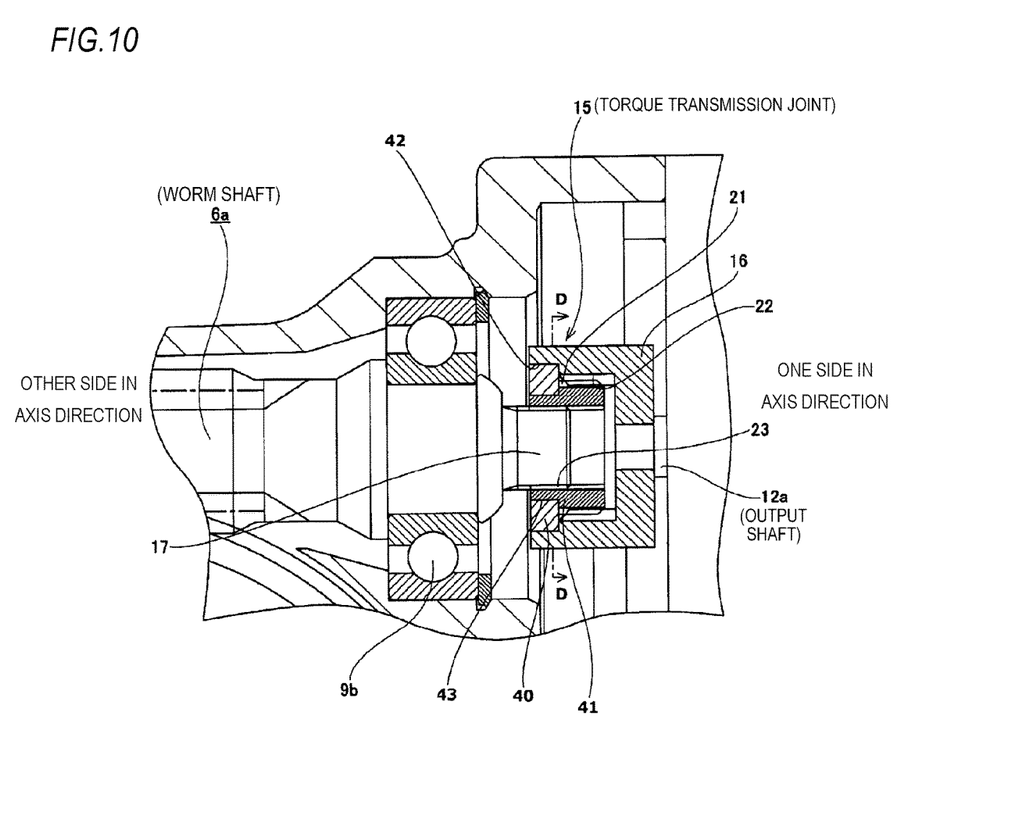
FIG. 10 is a view showing a modified embodiment of the present invention and corresponding to FIG. 3.
Figure 11:
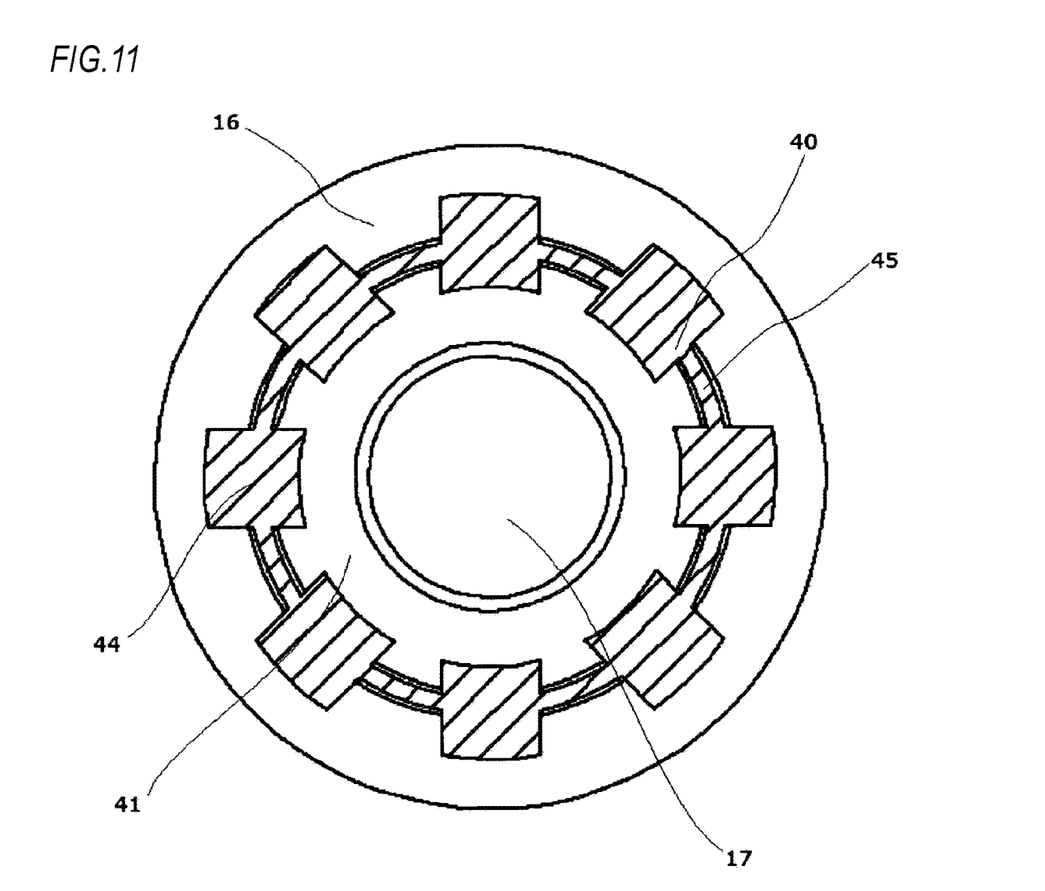
FIG. 11 is an enlarged sectional view taken along a line D-D of FIG. 10.

FIGS. 10 and 11 show a modified embodiment of the present invention.

In FIG. 10, a reference numeral "40" represents an elastic member of rubber, elastomer, or the like, and includes eight torque transmission portions 44 having rectangular parallelepiped shapes, and connection portions 45 connecting the torque transmission portions 44. In the end surface of the drive-side transmission member 16 positioned on the worm shaft 6a side, eight drive-side elastic-member receiving concave portions 42 are formed such that the outer circumferential sides of the torque transmission portions 44 can be fit therein.

In the end surface of a driven-side transmission member 41 positioned on the worm shaft 6a side, eight driven-side elastic-member receiving concave portions 43 are formed such that the inner circumferential sides of the torque transmission portions 44 can be fit therein.

Further, the outer circumferential portions and inner circumferential portions of the torque transmission portions 44 of the elastic member 40 are fit into the drive-side elastic-member receiving concave portions 42 and the driven-side elastic-member receiving concave portions 43, respectively, by pressing.

According to the configuration of the modified embodiment, the torque transmission performance between the drive shaft and the driven shaft can be divided into two stages according to the magnitude of transmission torque, and noise can be prevented from being generated when changing the rotation direction of the drive shaft.

This application is based on Japanese Patent Application No. 2014-184100, filed on Sep. 10, 2014, and Japanese Patent Application No. 2015-034806, filed on Feb. 25, 2015 and the entire contents of which are incorporated herein by reference.

DESCRIPTION OF REFERENCE NUMERALS AND SYMBOLS

1: STEERING WHEEL
2: STEERING SHAFT
3: HOUSING
4: WORM WHEEL
5: WORM TEETH
6, 6a: WORM SHAFT
7: ELECTRIC MOTOR
8: WORM
9a, 9b: ROLLING BEARING
10: PRESSING PIECE
11: COIL SPRING
12, 12a: OUTPUT SHAFT
13: SPLINE HOLE
14: SPLINE SHAFT PORTION
15: TORQUE TRANSMISSION JOINT
16: DRIVE-SIDE TRANSMISSION MEMBER
17: SPLINE SHAFT PORTION
18: COUPLING
19: DRIVE-SIDE ELASTIC MEMBER
20: DRIVEN-SIDE ELASTIC MEMBER
21: RADIALLY-OUTER-SIDE CONCAVE-CONVEX PORTION
22: DRIVE-SIDE CONCAVE-CONVEX PORTION
23: RADIALLY-INNER-SIDE CONCAVE-CONVEX PORTION
24: LARGE-DIAMETER PORTION
25: SMALL-DIAMETER PORTION
26: DRIVE-SIDE FIRST ENGAGEMENT PORTION
27: DRIVE-SIDE SECOND ENGAGEMENT PORTION
28: DIAMETER-REDUCED PORTION
29: ENGAGEMENT CONCAVE
30: CIRCULAR RING PORTION
31: DRIVEN-SIDE FIRST ENGAGEMENT PORTION
32: DRIVEN-SIDE SECOND ENGAGEMENT PORTION
33: PRELOAD APPLYING MECHANISM 34, 34a: CONCAVE
40: ELASTIC MEMBER
41: DRIVEN-SIDE TRANSMISSION MEMBER
42: DRIVE-SIDE ELASTIC-MEMBER RECEIVING CONCAVE PORTION
43: DRIVEN-SIDE ELASTIC-MEMBER RECEIVING CONCAVE PORTION
44: TORQUE TRANSMISSION PORTION
45: CONNECTION PORTION

The invention claimed is:

1. A torque transmission joint which is configured to transmit torque between a tip end portion of a drive shaft and a base end portion of a driven shaft arranged in series in an axis direction, the torque transmission joint comprising:
a coupling including:
a first concave-convex portion which is provided on one of inner and outer circumferential surfaces thereof, has concave portions and convex portions formed alternately in a circumferential direction over an entire circumference and is engaged with a drive-side concave-convex portion provided on a circumferential surface of the tip end portion of the drive shaft with a gap in the circumferential direction; and
a second concave-convex portion which is provided on the other of the inner and outer circumferential surfaces, has concave portions and convex portions formed alternately in the circumferential direction over the entire circumference and is engaged with a driven-side concave-convex portion provided on a circumferential surface of the base end portion of the driven shaft with a gap in the circumferential direction;
a drive-side elastic member which is made of an elastic material and is provided between the drive shaft and the coupling such that torque can be transmitted; and
a driven-side elastic member which is made of an elastic material and is provided between the coupling and the driven shaft such that torque can be transmitted,
wherein a concave-convex shape of the first concave-convex portion in the circumferential direction and a concave-convex shape of the second concave-convex portion in the circumferential direction are different from each other.

2. The torque transmission joint according to claim 1, wherein the drive-side elastic member includes:
a drive-side first engagement portion which is provided on one side portion of the circumferential surface thereof in the axis direction over the entire circumference and is engaged with the drive-side concave-convex portion; and
a drive-side second engagement portion which is provided on the other side portion of the circumferential surface thereof in the axis direction over the entire circumference and is engaged with the second concave-convex portion,
wherein the driven-side elastic member includes:
a driven-side first engagement portion which is provided on one side portion of the circumferential surface thereof in the axis direction over the entire circumference and is engaged with the first concave-convex portion; and
a driven-side second engagement portion provided on the other side portion of the circumferential surface thereof in the axis direction over the entire circumference and is engaged with the driven-side concave-convex portion,
wherein the gap in the circumferential direction between the first concave-convex portion and the drive-side concave-convex portion is larger than a gap in the circumferential direction between the drive-side first engagement portion and the drive-side concave-convex portion and than a gap in the circumferential direction between the drive-side second engagement portion and the second concave-convex portion, and
wherein the gap in the circumferential direction between the second concave-convex portion and the driven-side concave-convex portion is larger than a gap in the circumferential direction between the driven-side first engagement portion and the first concave-convex portion and than a gap in the circumferential direction between the driven-side second engagement portion and the driven-side concave-convex portion.

3. The torque transmission joint according to claim 1, wherein at least at an end portion of an engagement portion between the first concave-convex portion and the drive-side concave-convex portion on one side in the axis direction, the gap in the circumferential direction between the first concave-convex portion and the drive-side concave-convex portion increases as proceeding toward one side in the axis direction.

4. The torque transmission joint according to claim 3, wherein at least at the end portion, side surfaces of adjacent concave portions constituting the first concave-convex portion, which face each other in the circumferential direction separate farther from each other as proceeding toward the one side in the axis direction.

5. The torque transmission joint according to claim 1, wherein in a state where the torque transmission joint is assembled between the drive shaft and the driven shaft, at least one of the drive-side elastic member and the driven-side elastic member exerts elastic force in the axis direction.

6. The torque transmission joint according to claim 5, wherein the drive-side elastic member includes:
a large-diameter portion which is provided on one side in the axis direction and has the drive-side first engagement portion;
a small-diameter portion which is provided on the other side in the axis direction and has the drive-side second engagement portion; and
a diameter-reduced portion which is provided at a middle portion between the large-diameter portion and the small-diameter portion in the axis direction.

7. An electric power steering system comprising:
a housing which is supported on a fixed part to be unrotatable;
a rotating shaft which is provided to be rotatable with respect to the housing and is rotated by operating a steering wheel to provide a steering angle to steered wheels according to the rotation;
a worm wheel which is supported on a portion of the rotating shaft inside the housing coaxially with the rotating shaft and is rotated together with the rotating shaft;
a worm which includes worm teeth formed on a middle portion of a worm shaft in an axis direction, wherein in a state where the worm teeth are engaged with the worm wheel, both end portions of the worm shaft in the axis direction are supported by bearings, respectively, to be rotatable with respect to the housing; and
an electric motor which rotates the worm, wherein an output shaft of the electric motor and the worm shaft are connected by the torque transmission joint according to claim 1 such that torque can be transmitted.

8. The electric power steering system according to claim 7, further comprising:
a preload applying mechanism which is provided between the housing and a tip end portion of the worm shaft and elastically presses the worm toward the worm wheel.

9. The electric power steering system according to claim 7,
wherein the tip end portion of the output shaft and a base end portion of the worm shaft is arranged so as to overlap each other in a radial direction.

* * * * *